United States Patent
Oba et al.

(10) Patent No.: US 9,058,566 B2
(45) Date of Patent: Jun. 16, 2015

(54) CONTROL DEVICE, CONTROL METHOD, AND COMPUTER PROGRAM PRODUCT

(75) Inventors: Yoshihiro Oba, Kanagawa (JP); Yasuyuki Tanaka, Kanagawa (JP); Mitsuru Kanda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 874 days.

(21) Appl. No.: 13/232,341

(22) Filed: Sep. 14, 2011

(65) Prior Publication Data
US 2012/0166011 A1 Jun. 28, 2012

(30) Foreign Application Priority Data
Dec. 28, 2010 (JP) ................................. 2010-292435

(51) Int. Cl.
*G05D 3/12* (2006.01)
*G06Q 10/00* (2012.01)
(Continued)

(52) U.S. Cl.
CPC .............. *G06Q 10/00* (2013.01); *G06Q 20/388* (2013.01); *G06Q 50/06* (2013.01)

(58) Field of Classification Search
CPC .............. Y02T 90/128; Y02T 10/7088; B60L 11/1846; B60L 11/1848; B60L 11/1824; B60L 11/1838; B60L 11/184; B60L 11/1842; B60L 11/1844; Y04S 30/14; Y04S 10/126; Y04S 50/10; Y04S 50/12; Y02E 60/721; G06Q 10/00; G06Q 50/06; G06Q 20/388
See application file for complete search history.

(56) References Cited

U.S. PATENT DOCUMENTS 8,493,025 B2 * 7/2013 Turner ........................ 320/109
2009/0184689 A1 * 7/2009 Kressner et al. ............. 320/162
(Continued)

FOREIGN PATENT DOCUMENTS

JP 2004-102486 4/2004
JP 2006-94655 4/2006
(Continued)

OTHER PUBLICATIONS

Office Action issued Nov. 20, 2012 in Japanese Application No. 2010-292435 (With English Translation).
(Continued)

*Primary Examiner* — Sean Shechtman
(74) *Attorney, Agent, or Firm* — Oblon, McClelland, Maier & Neustadt, L.L.P.

(57) ABSTRACT

According to an embodiment, a control device includes a detecting unit, a communication unit, and a control unit. The detecting unit detects that a power-supplied device is connected to a power supply line relaying supply of power. The communication unit receives consumer authentication information including consumer identification information for identifying a consumer from a communication device when it is detected that the power-supplied device is connected to the power supply line, transmits the consumer authentication information to a first server, receives power-supply-availability determination information representing whether supply of power to the power-supplied device is possible or not, from the first server, and transmits power measurement information representing power supplied to the power-supplied device through the power supply line and the consumer identification information to a second server. The control unit supplies power to the power-supplied device when the power-supply-availability determination information represents that supply of power is possible.

14 Claims, 6 Drawing Sheets

(51) Int. Cl.
*G06Q 20/38* (2012.01)
*G06Q 50/06* (2012.01)

(56) References Cited

U.S. PATENT DOCUMENTS

2010/0274656 A1* 10/2010 Genschel et al. .......... 705/14.27
2011/0202217 A1* 8/2011 Kempton ..................... 701/22

FOREIGN PATENT DOCUMENTS

| JP | 2008-131726 | 6/2008 |
| JP | 2008-160902 | 7/2008 |
| JP | 2009-129384 | 6/2009 |
| JP | 2010-146569 | 7/2010 |
| JP | 2010-268602 | 11/2010 |
| JP | 2010-284037 | 12/2010 |

OTHER PUBLICATIONS

Mitsuru Kanda, et al., "AMSO™ Unified Key Management Mechanism Integrating Authentication and Encryption for Smart Meters", Toshiba Review, Toshiba Corporation, vol. 65, No. 23 to 27, Sep. 1, 2010, pp. 23-27.

Akihiro Oya, "Electricity buying and selling System for Vechicle", Denso Journal of technical disclosure, Denso Corporation, No. 154, Jan. 15, 2007, 2 pages.

Office Action issued Jan. 30, 2014, in Chinese Patent Application No. 201110272010.7 with English translation.

Office Action issued Dec. 12, 2014 in Chinese Patent Application No. 201110272010.7 (with English translation).

Notice of Reexamination Decision issued in Chinese Patent Application No. CN-201110272010.7, dated Apr. 20, 2015 (43 pages).

* cited by examiner

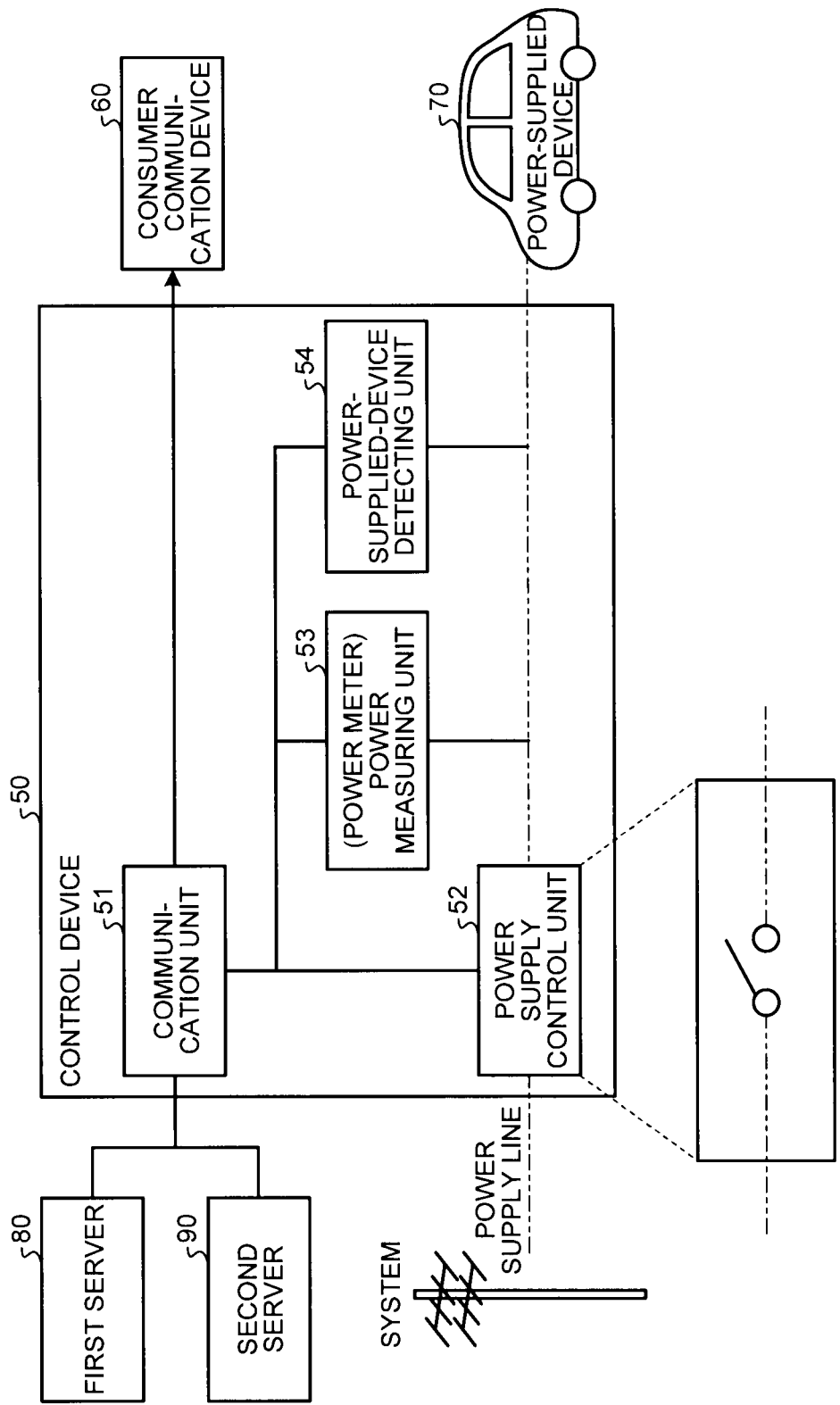

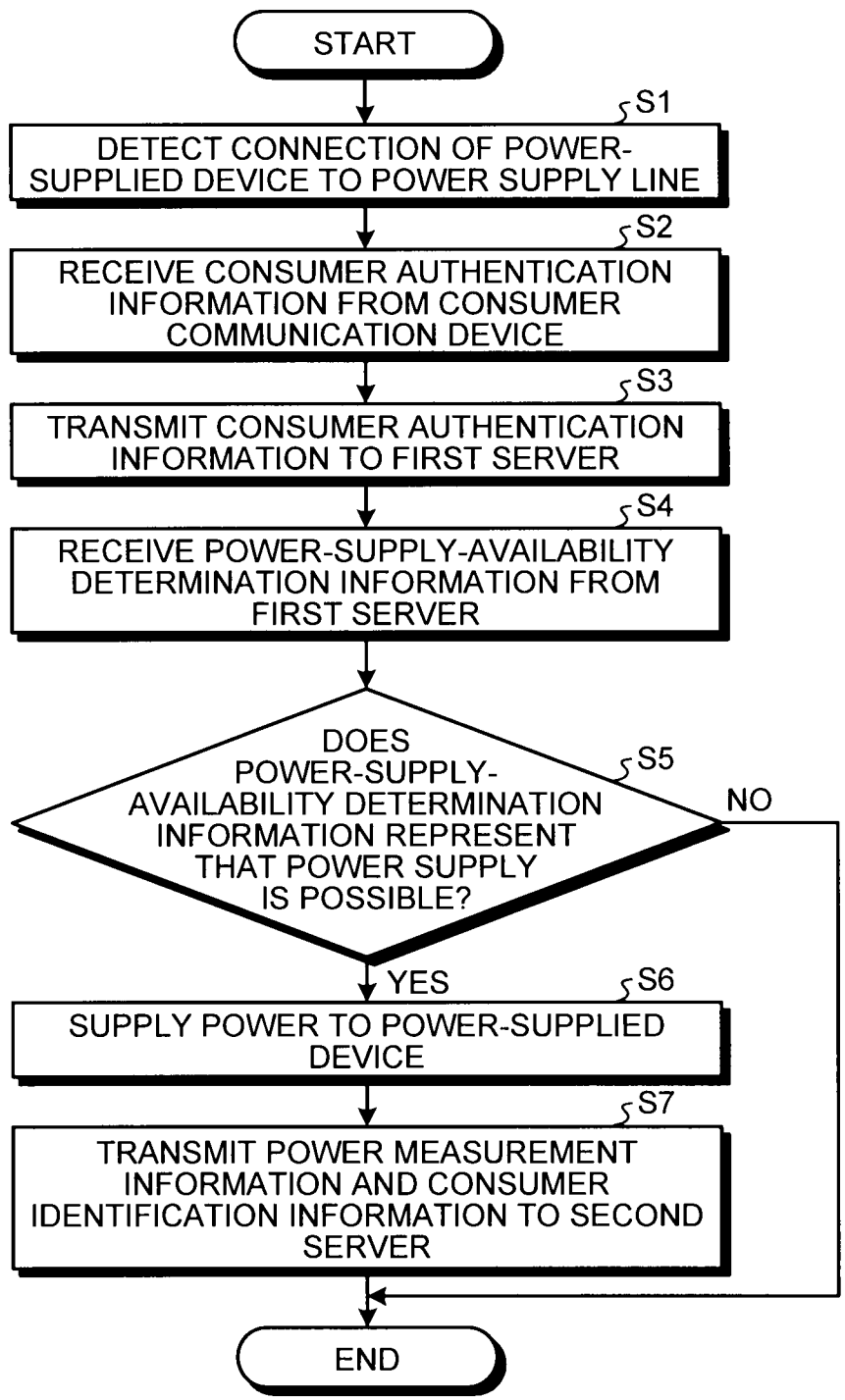

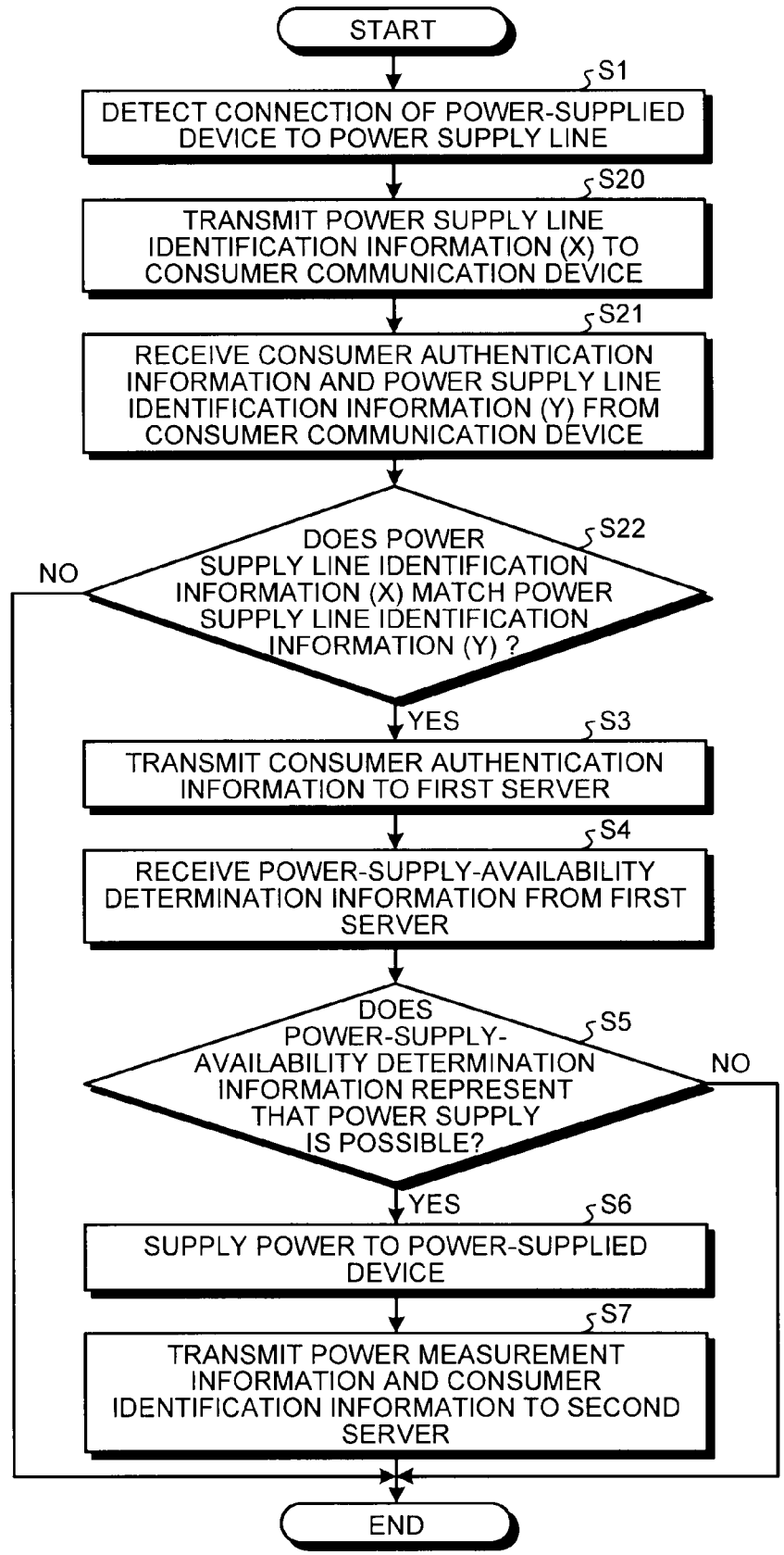

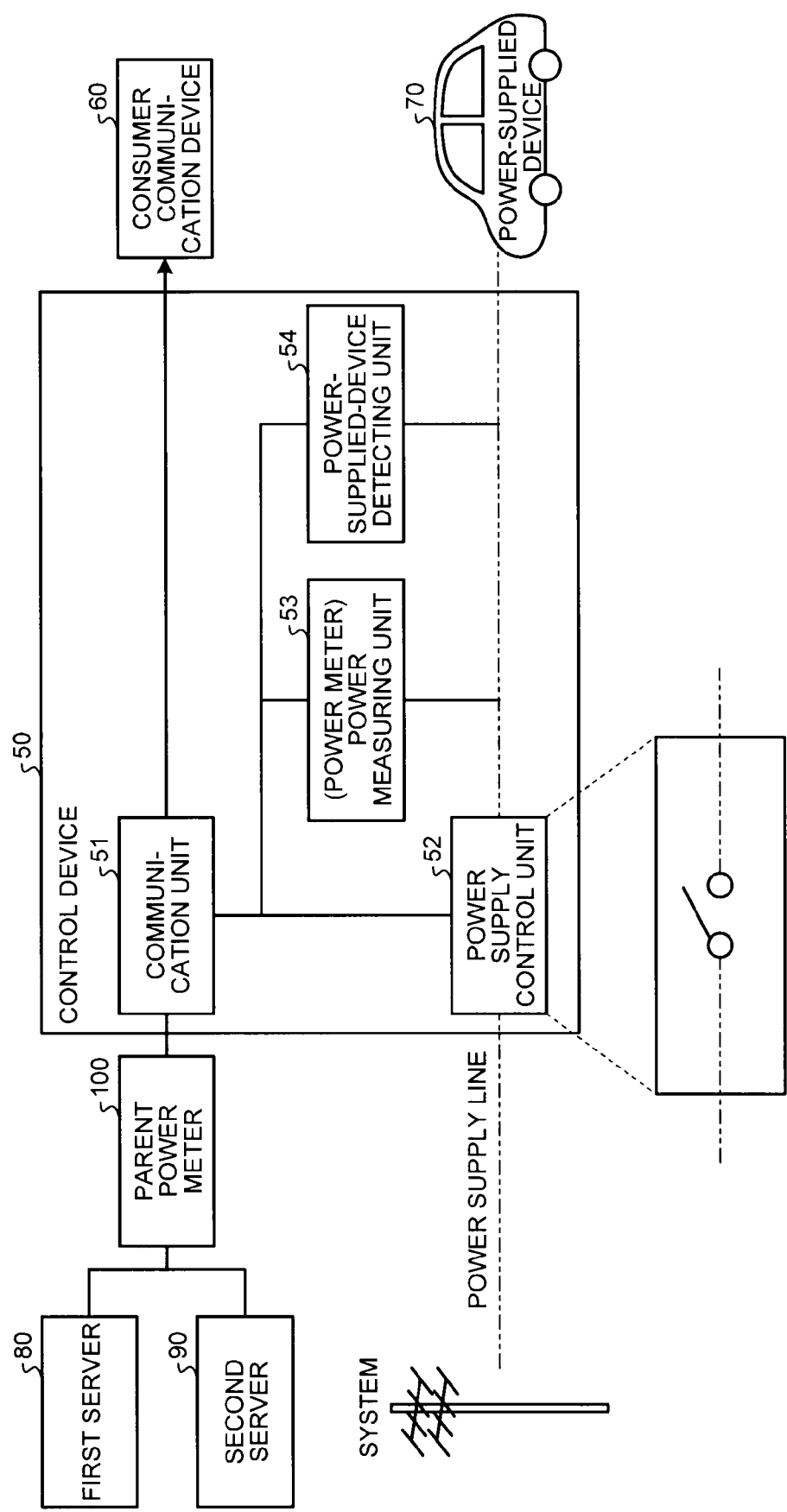

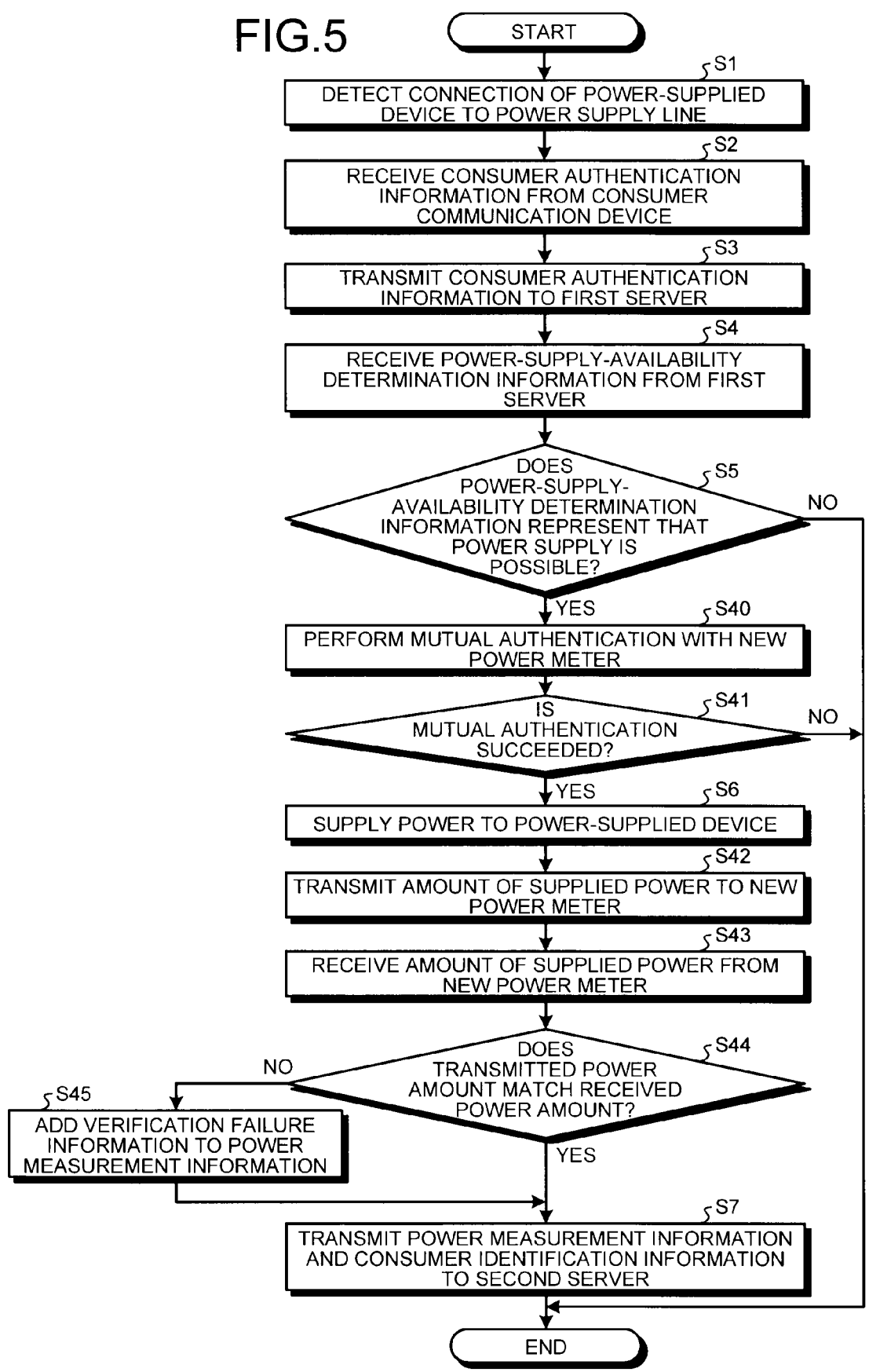

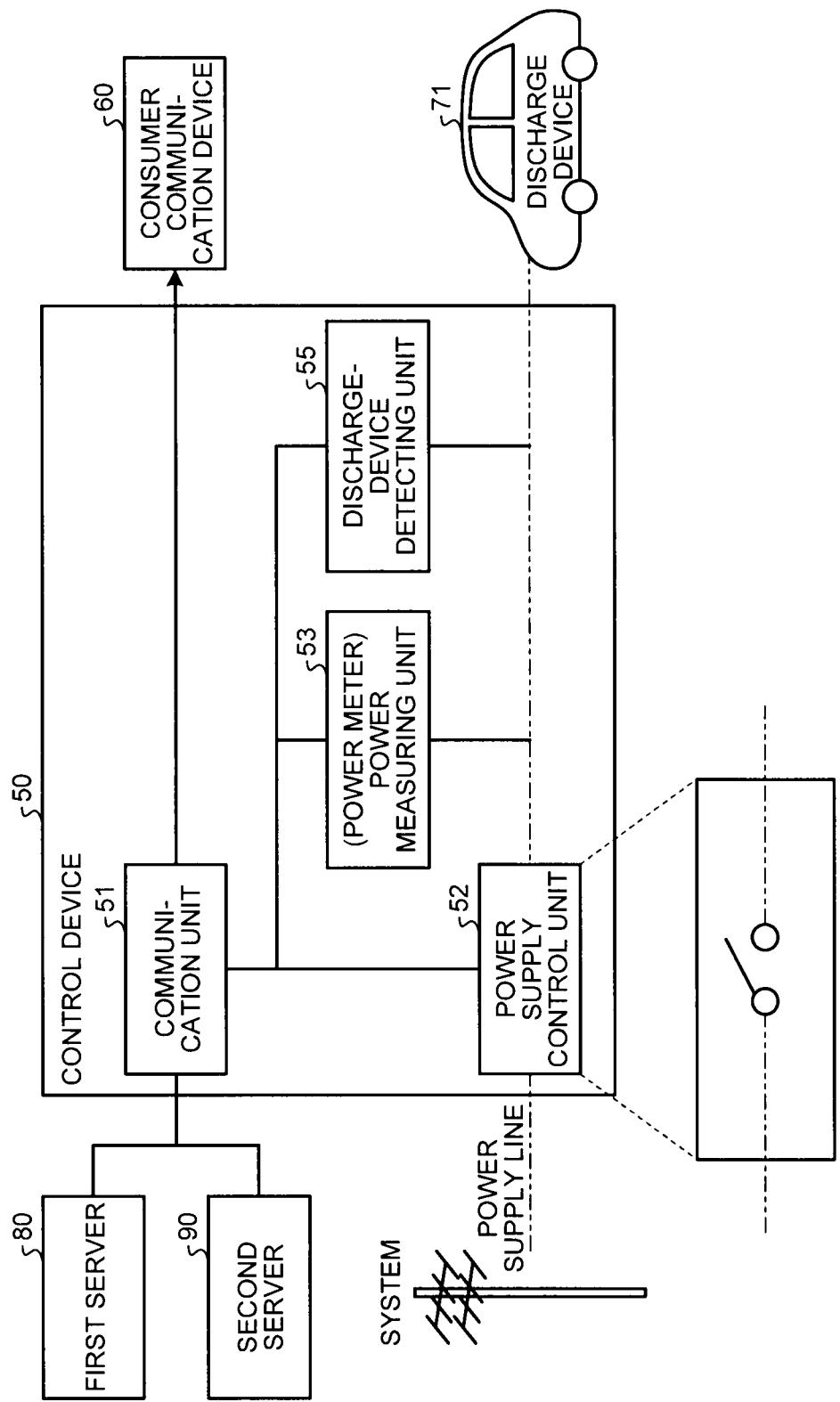

CONTROL DEVICE, CONTROL METHOD, AND COMPUTER PROGRAM PRODUCT

CROSS-REFERENCE TO RELATED APPLICATIONS

This application is based upon and claims the benefit of priority from Japanese Patent Application No. 2010-292435, filed on Dec. 28, 2010; the entire contents of which are incorporated herein by reference.

FIELD

Embodiments described herein relate generally to a control device, a control method, and a computer program product.

BACKGROUND

There have been electric charging stations that perform supply of power (referred to as power feeding) to electric vehicles. Electric vehicles can be fed with power in the electric charging stations so as to be charged. In the electric charging stations, power meters are provided to measure amounts of power (power amounts) supplied from an electric power company and periods of time taken for supplying power. The power meters measure power supplied to electric vehicles, and on the basis of the measured power, users of the electric vehicles are charged to pay for charging on the electric vehicles (referred to as charging rates).

The owners of the electric charging stations have been designated as consumers corresponding to the power meters for measuring power supplied in the electric charging stations, regardless of the users of the electric vehicles actually receiving supply of power from the electric charging stations. This type of power feeding business has a payment model in which the users of the electric vehicles pay charging rates to the owners of the electric charging stations and the owners of the electric charging stations have paid utility rates for use of power to the electric power company with which the owners of the electric charging stations make contracts, and it has been difficult to implement other payment models. As an example of other payment models, there is a payment model in which users of electric vehicles directly pay all or a part of the charging rates to electric power companies with which the users make contracts as consumers. In this payment model, the electric power companies with which the users of the electric vehicles make contracts may be different from electric power companies that supply power to electric charging stations. In order to make it possible to realize this payment model, it has been required to make it possible to dynamically and safely change a correspondence relation between power meters and consumers.

BRIEF DESCRIPTION OF THE DRAWINGS

FIG. 1 is a diagram illustrating a configuration of a charge/discharge control system according to a first embodiment;

FIG. 2 is a flow chart illustrating a procedure of a charge/discharge control process according to the first embodiment;

FIG. 3 is a flow chart illustrating a procedure of a charge/discharge control process according to a second embodiment;

FIG. 4 is a diagram illustrating a configuration of a charge/discharge control system according to a third embodiment;

FIG. 5 is a flow chart illustrating a procedure of a charge/discharge control process according to the third embodiment; and FIG. 6 is a diagram illustrating a configuration of a charge/discharge control system according to a modification.

DETAILED DESCRIPTION

According to an embodiment, a control device includes a detecting unit, a communication unit, and a control unit. The detecting unit detects that a power-supplied device is connected to a power supply line relaying supply of power. The communication unit receives consumer authentication information including consumer identification information for identifying a consumer from a communication device when it is detected that the power-supplied device is connected to the power supply line, transmits the consumer authentication information to a first server, receives power-supply-availability determination information representing whether supply of power to the power-supplied device is possible or not, from the first server, and transmits power measurement information representing power supplied to the power-supplied device through the power supply line and the consumer identification information to a second server. The control unit supplies power to the power-supplied device when the power-supply-availability determination information represents that supply of power is possible.

Various embodiments will be described hereinafter with reference to the accompanying drawings.

First Embodiment

A configuration of a charge/discharge control system according to the first embodiment will be described with reference to FIG. 1. The charge/discharge control system includes a control device 50, a first server 80, a second server 90, a power-supplied device 70, and a consumer communication device 60. The power-supplied device 70 is, for example, an electric vehicle having a storage battery unit for storing power. The control device 50 is disposed, for example, at an electric charging station, is connected to a power supply line for relaying supply of power from an electric power company, and supplies power to the power-supplied device 70 connected to the power supply line. The control device 50, the first server 80, and the second server 90 are connected through a communication network. The communication network is, for example, a wireless local area network (LAN), a wire LAN, an optical line network, a telephone line network, an intranet, the Ethernet (registered as a trademark), or the Internet, or a combination thereof. The consumer communication device 60 may be a communication device integrated with the power-supplied device 70, or may be a communication device separable from the power-supplied device 70. The former communication device is implemented, for example, by a communication module built in the storage battery unit included in the power-supplied device 70, and the latter communication device is, for example, a portable phone terminal or an ETC unit mounted on the power-supplied device 70. In the present embodiment, the consumer communication device 60 and the control device 50 is configured to perform communication by a communication means capable of exclusive communicating only in a case where they are in the vicinity of each other, that is, a case where they are within an area in which they can communicate with each other, and the control device 50 is configured to communicate with the consumer communication device 60 corresponding to the power-supplied device 70 in a one-to-one manner. As this communication means, for example, there are communication which uses a wire communication channel forming a pair with the power supply line on one-to-one basis, and near field communication with high directivity, such as RFID and IrDA. In general, even in near field communication, such as ZigBee and Wi-Fi, with relatively loose restrictions on the directivity and a communication distance, a one-to-one correspondence between the control device 50 and the consumer communication device 60 corresponding to the power-supplied device 70 may be implemented by beamforming, transmission power suppression, etc.

Next, a software configuration of the control device 50 will be described. The control device 50 includes a control unit, such as a central processing unit (CPU), for controlling the whole device, a main storage unit, such as a read only memory (ROM) and a random access memory (RAM), for storing a variety of data and various programs, an auxiliary storage unit, such as a hard disk drive (HDD) and a compact disk (CD), for storing a variety of data and various programs, a communication interface (I/F) for controlling communication with an external device, and buses for connecting them, and has a hardware configuration using a general computer. The control device 50 may be connected to a display unit for displaying information, a manipulation input unit such as a keyboard and a mouse for receiving an instruction input of a user, and the like, in a wired or wireless manner.

Next, a description will be made with respect to various functions implemented by the control device 50 in such a hardware configuration with reference to FIG. 1. The control device 50 includes a communication unit 51, a power supply control unit 52, a power measuring unit 53, and a power-supplied-device detecting unit 54. The function of the communication unit 51 is implemented by running various programs stored in the main storage unit and the auxiliary storage unit by the communication I/F included in the control device 50 and the CPU included in the control device 50. Each of the functions of the power supply control unit 52, the power measuring unit 53, and the power-supplied-device detecting unit 54 is implemented by running various programs stored in the main storage unit and the auxiliary storage unit by the CPU included in the control device 50.

The communication unit 51 controls communication with external devices such as the first server 80, the second server 90, the consumer communication device 60, and the like. In a case where the communication unit 51 performs communication with the consumer communication device 60, only when they are within an area in which they can communicate with each other, the communication unit 51 serves as the communication means capable of exclusive communication. Examples of the communication means are as described above. The communication unit 51 may perform communication with an external device as follows, for example. The communication unit 51 receives consumer authentication information including consumer identification information from the consumer communication device 60, transmits the consumer authentication information to the first server 80 under the control of the power supply control unit 52 to be described below, receives power-supply-availability determination information representing whether supply of power to the power-supplied device 70 is possible or not, and transmits power measurement information representing power supplied to the power-supplied device 70 and the consumer identification information to the second server 90.

Examples of the consumer identification information include an identification number of the storage battery unit included in the power-supplied device 70, a frame number of the power-supplied device 70, a vehicle registration number, a vehicle number, identification numbers of various cards for payment, such as a credit card, a debit card, and a prepaid card, an identification number of a contact or non-contact IC card, an identification number of a passive or active IC tag, a contract account identification number of an electric power company, an electronic mail address, a Network Access Identifier (NAI) defined in RFC 4282, a Uniform Resource Identifier (URI) defined in RFC 3986, a telephone number of a consumer, and an arbitrary combination of two or more of those information items. Examples of consumer authentication information except the consumer identification information include a digital certificate given to a consumer, and a digital certificate given to the first server 80.

The power-supplied-device detecting unit 54 detects that the power-supplied device 70 is connected to the power supply line. The power supply control unit 52 controls supply of power (power feeding) to the power-supplied device 70 connected to the power supply line. Specifically, in the first embodiment, in the case where the power-supplied-device detecting unit 54 detects that the power-supplied device 70 is connected to the power supply line, if receiving the consumer authentication information from the consumer communication device 60 through the communication unit 51, the power supply control unit 52 transmits the consumer authentication information to the first server 80 through the communication unit 51. Further, if receiving the power-supply-availability determination information from the first server 80 through the communication unit 51, the power supply control unit 52 supplies power to the power-supplied device 70 through the power supply line in a case where the power-supply-availability determination information represents that supply of power is possible. With regard to supply of power to the power-supplied device 70, the power supply control unit 52 transmits the power measurement information, representing power measured by the power measuring unit 53, and the consumer identification information to the second server 90 through the communication unit 51. The power measuring unit 53 measures the power supplied to the power-supplied device 70 under the control of the power supply control unit 52, and specifically, measures, for example, an amount of power (power amount) supplied to the power-supplied device 70 and a period of time when the power has been supplied.

An outline of a configuration of the first server 80 will be described. The first server 80 stores therein consumer identification information of consumers capable of using the charge/discharge control system in advance. If receiving consumer authentication information from the control device 50, the first server 80 performs an authentication process to determine whether consumer identification information matching consumer identification information included in the received consumer authentication information exists in the stored consumer authentication information or not. Then, if the determination result is positive, the first server 80 transmits the power-supply-availability determination information, representing that supply of power to the power-supplied device 70 used by the consumer is possible, to the control device 50, and if the determination result is negative, the first server 80 transmits the power-supply-availability determination information, representing that supply of power to the power-supplied device 70 used by the consumer is impossible, to the control device 50.

Next, an outline of a configuration of the second server 90 will be described. The second server 90 stores therein the consumer identification information of the consumers capable of using the charge/discharge control system in advance. If receiving the power measurement information and the consumer identification information from the control device 50, the second server 90 performs a billing process for requesting payment of a utility rate (referred to as a charging rate) for power supplied to the consumer identified by the consumer identification information, using the power measurement information.

Next, the procedure of a charge/discharge control process, which the control device 50 performs, according to the first embodiment will be described with reference to FIG. 2. In step S1, the control device 50 detects that the power-supplied device 70 is connected to the power supply line, by the function of the power-supplied-device detecting unit 54. Next, in step S2, the control device 50 receives the consumer authentication information including the consumer identification information from the consumer communication device 60 by the function of the communication unit 51. Then, in step S3, the control device 50 transmits the consumer authentication information to the first server 80. If receiving the consumer authentication information, the first server 80 performs the authentication process described above, and transmits the power-supply-availability determination information representing the result of authentication process to the control device 50.

If receiving the power-supply-availability determination information from the first server 80 in step S4, in step S5, the control device 50 determines whether the power-supply-availability determination information represents that supply of power is possible or not, by the function of the power supply control unit 52. In a case where the power-supply-availability determination information does not represent that supply of power is possible (No in step S5), the control device 50 ends the charge/discharge control process without performing supply of power to the power-supplied device 70. In contrast, in a case where the power-supply-availability determination information represents that supply of power is possible (Yes in step S5), in step S6, the control device 50 supplies power to the power-supplied device 70 through the power supply line. At this time, the control device 50 measures the amount of power (power amount) supplied to the power-supplied device 70 and the period of time when the power has been supplied to the power-supplied device 70, by the function of the power measuring unit 53. Next, in step S7, the control device 50 transmits the power measurement information, representing the power measured by the function of the power measuring unit 53, and the consumer identification information received in step S2, to the second server 90 by the function of the communication unit 51.

As described above, in the first embodiment, the first server 80 authenticates the consumer using the consumer authentication information that the control device 50 having the power measuring unit 53 as the power meter receives from the consumer communication device 60, and the control device 50 performs supply of power to the power-supplied device 70, which the consumer uses, according to the authentication result. Therefore, it becomes possible to dynamically change the correspondence relation between the power meter and the consumers. As a result, the second server 90 can perform the billing process on the consumer, who has actually received the supply of the power, using the power measurement information and the consumer identification information transmitted from the control device 50. Therefore, it becomes possible to implement the payment model in which the user of the power-supplied device 70 directly pays all or a part of the charging rate to the electric power company with which the user makes a contract as the consumer, which is so-called power roaming.

Second Embodiment

Next, a second embodiment will be described. Parts that are common to the first embodiment and the second embodiment will be described by using the same reference symbols, or will not be described.

In the second embodiment, the control device 50 checks the correspondence relation between the power-supplied device 70 connected to the power supply line and the consumer communication device 60, and supplies power to the power-supplied device 70 on the basis of the check result. In this configuration, each of the power supply lines that can be connected to the power-supplied device 70 is given power supply line identification information for identifying the power supply line. The power supply line identification information may be a unique identifier in the charge/discharge control system and the control device 50, and may be a globally unique identifier. The control device 50 stores the power supply line identification information given to the power supply line to be connected to the control device 50, for example, in the auxiliary storage unit.

The configuration of the charge/discharge control system according to the second embodiment is the same as that illustrated in FIG. 1. However, in a case where the power supply line connected from the electric power company is divided into a plurality of power supply lines, and the power measuring unit 53 is disposed as the power meter for each of the plurality of divided power supply lines, the control device 50 may have a plurality of the power measuring units 53. In the case where the communication unit 51 communicates with the consumer communication device 60, the communication unit 51 may not serve as the communication means capable of performing exclusive communication only when the communication unit 51 and the consumer communication device 60 are within an area in which they can communicate with each other. Further, in the case where the power-supplied-device detecting unit 54 detects that the power-supplied device 70 is connected to a power supply line, the communication unit 51 transmits the power supply line identification information, given to the power supply line, to the consumer communication device 60. In response to this, if the consumer communication device 60 transmits the power supply line identification information and the consumer authentication information received from the control device 50 to the control device 50, the communication unit 51 receives the power supply line identification information and the consumer authentication information from the consumer communication device 60. Furthermore, the power supply line identification information may be included in the consumer authentication information.

In the case where the power-supplied-device detecting unit 54 detects that the power-supplied device 70 is connected to a power supply line, the power supply control unit 52 transmits the power supply line identification information, given to the power supply line, to the consumer communication device 60 through the communication unit 51. Further, if receiving power supply line identification information and consumer authentication information from the consumer communication device 60 through the communication unit 51, the power supply control unit 52 checks the correspondence relation between the power-supplied device 70 connected to the power supply line and the consumer communication device 60 by determining whether the received power supply line identification information matches the power supply line identification information, given to the power supply line through which connection of the power-supplied device 70 has been detected, or not. Then, in a case where the former power supply line identification information matches the latter power supply line identification information, the power supply control unit 52 transmits the consumer authentication information, received from the consumer communication device 60, to the first server 80 through the communication unit 51. Further, if receiving power-supply-availability determination information from the first server 80 through the communication unit 51, in a case where the power-supply-availability determination information represents that supply of power is possible, the power supply control unit 52 supplies power to the power-supplied device 70 through the power supply line. With respect to the supply of the power to the power-supplied device 70, similarly to the first embodiment, the power supply control unit 52 transmits the power measurement information, representing power measured by the power measuring unit 53, and the consumer identification information to the second server 90 through the communication unit 51.

Next, the procedure of the charge/discharge control process, which the control device 50 performs, according to the second embodiment will be described with reference to FIG. 3. Step S1 is the same as that of the first embodiment. In step S20, the control device 50 transmits the power supply line identification information (X), given to the power supply line through which the connection to the power-supplied device 70 has been detected in step S1, to the consumer communication device 60 by the function of the communication unit 51. Next, if receiving the power supply line identification information (Y) and the consumer authentication information from the consumer communication device 60 in step S21, the control device 50 determines whether the power supply line identification information (X) given to the power supply line through which the connection to the power-supplied device 70 has been detected in step S1 matches the power supply line identification information (Y) received from the consumer communication device 60 in step S21, by the function of the power supply control unit 52. If the former power supply line identification information (X) does not match the latter power supply line identification information (Y) (No in step S22), the consumer communication device 60 corresponding to the power-supplied device 70 to which power can be supplied does not match the consumer communication device 60 which is communicating with the control device 50. That is, the power-supplied device 70 which is a subject to be supplied with power by the control device 50 is not in one-to-one correspondence with the consumer communication device 60 of the consumer to receive power for the power-supplied device 70. In this case, the control device 50 ends the charge/discharge control process without performing supply of power to the power-supplied device 70. In contrast, in a case where the former power supply line identification information (X) matches the latter power supply line identification information (Y) (Yes in step S22), the consumer communication device 60 belonging to the consumer regarding the power-supplied device 70 to which power can be supplied matches the consumer communication device 60 which is communicating with the control device 50. That is, the power-supplied device 70 which is a subject to be supplied with power by the control device 50 is in one-to-one correspondence with the consumer communication device 60 of the consumer to receive power for the power-supplied device 70. In this case, the charge/discharge control process proceeds to step S3. Steps S3 to S7 are the same as those of the first embodiment.

According to the above-mentioned configuration, similarly to the first embodiment, it is possible to dynamically change the correspondence relation between the power meter and the consumers. In addition, even in a case where exclusive communication between the communication unit 51 and the consumer communication device 60 is difficult, for example, a case where the plurality of power measuring units 53 serving as the power meters exist in the vicinity of the consumer communication device 60, it is possible to check the one-to-one correspondence relation between the consumer communication device 60 and the power-supplied device 70 by receiving the power supply line identification information from the consumer communication device 60. As a result, the second server 90 can perform the billing process on the consumer, who has actually received the power for the power-supplied device 70, using the power measurement information and the consumer identification information transmitted from the control device 50. Therefore, it becomes possible to implement the payment model in which the user of the power-supplied device 70 directly pays all or a part of the charging rate to the electric power company with which the user makes a contract, which is so-called power roaming.

Third Embodiment

Next, a third embodiment will be described. Parts that are common to the third embodiment, and the first embodiment or the second embodiment will be described by using the same reference symbols, or will not be described.

FIG. 4 is a diagram illustrating a configuration of a charge/discharge control system according to the third embodiment. As shown in FIG. 4, the charge/discharge control system further includes a parent power meter 100 between the control device 50 and the first and second servers 80 and 90. When the power measuring unit 53 included in the control device 50 is referred to as a sub power meter, the parent power meter 100 is disposed in the upstream of the sub power meter, and measures power supplied through the power supply line connected to the control device 50. The control device 50 is connected to the first server 80 and the second server 90 through the parent power meter 100. In this configuration, the power measuring unit 53, which is included in the control device 50 as the sub power meter, may be one as shown in FIG. 4; however, the power supply line connected to the electric power company may be connected to the parent power meter 100 and be divided into a plurality of power supply lines each of which may be connected to a sub power meter, and the control device 50 may have the plurality of sub power meters. The parent power meter 100 is given a key for authenticating the parent power meter 100 in advance. When transmitting the power-supply-availability determination information, transmitted from the first server 80, to the control device 50, the parent power meter 100 adds authentication information including the key to the power-supply-availability determination information and transmits the power-supply-availability determination information having the authentication information added thereto, to the control device 50.

Here, different points of a functional configuration of the control device 50 according to the third embodiment from the first embodiment will be described specifically. The communication unit 51 transmits the consumer authentication information to the first server 80 through the parent power meter 100, or receives the power-supply-availability determination information, which has been transmitted from the first server 80 and to which the authentication information has been added, from the parent power meter 100. Under the control of the power supply control unit 52, with respect to the power for the power-supplied device 70, the communication unit 51 transmits the power measurement information, representing power measured by the power measuring unit 53, to the parent power meter 100, and receives the power measurement information, representing power measured by the parent power meter 100, from the parent power meter 100, or transmits authentication failure information to be described below, the power measurement information, and the consumer identification information to the second server 90 through the parent power meter 100 in response to a result of verification of the power measurement information.

In a case where the communication unit 51 receives the power-supply-availability determination information, to which the authentication information of the parent power meter 100 has been added, from the first server 80 through the parent power meter 100, and a case where the power-supply-availability determination information represents that supply of power is possible, the power supply control unit 52 performs mutual authentication with the parent power meter 100 so as to determine whether they are appropriate devices for each other, and supplies power to the power-supplied device 70 through the power supply line in response to a result of the mutual authentication. In order to perform the mutual authentication, the parent power meter 100 transmits the authentication information of the control device 50 together with the consumer device authentication information to the first server 80. The authentication information of the control device 50 may be included in the consumer device authentication information. Further, in a case where the power supply control unit 52 is authenticated from the first server 80, the power-supply-availability determination information representing that supply of power is possible from the first server 80 includes an authentication result of the control device 50, and further includes a session key necessary for the mutual authentication with the control device 50 in a case where the authentication result of the control device 50 is positive. This session key is generated between the control device 50 and the first server 80 when the control device 50 is authenticated from the first server 80. For example, in a case of using the Extensible Authentication Protocol (EAP) defined in RFC 3748 for the authentication between the control device 50 and the first server 80, a master session key (MSK) may be used as the session key. The mutual authentication between the parent power meter 100 and the control device 50 is performed by exchanging control messages, signed using a hash function, between the parent power meter 100 and the control device 50 by using the session key, and verifying signature information. The verification of the signature information succeeds in a case where the signature information received from a transmitter matches the signature information generated by signature on the received control message using the session key which a receiver has. In this case, the power supply control unit 52 transmits the power measurement information, representing the power measured by the power measuring unit 53, to the parent power meter 100 through the communication unit 51, and performs verification to determine whether the power represented by the power measurement information matches the power represented by the power measurement information received from the parent power meter 100 through the communication unit 51. In a case where the result of the verification is that the former power does not match the latter power, the power supply control unit 52 generates verification failure information representing the difference between the former power and the latter power, and transmits the power measurement information having the verification failure information added thereto, and the consumer identification information to the second server 90 through the communication unit 51 and the parent power meter 100. In contrast, in a case where the former power matches the latter power, the power supply control unit 52 transmits the power measurement information, representing the power measured by the power measuring unit 53, and the consumer identification information to the second server 90 through the communication unit 51 and the parent power meter 100.

Next, a procedure of a charge/discharge control process, which the control device 50 performs, according to the third embodiment will be described with reference to FIG. 5. In FIG. 5, it is assumed that the authentication information of the control device 50 is included in the consumer authentication information. Steps S1 to S5 are almost the same as those of the first embodiment. However, in step S3, the control device 50 transmits the consumer authentication information and the authentication information of the control device 50 to the first server 80 through the parent power meter 100. Also, in step S4, the control device 50 receives the power-supply-availability determination information, which is transmitted from the first server 80, includes the authentication result of the control device 50, and further includes the session key necessary for the mutual authentication between the parent power meter 100 and the control device 50 in the case the authentication result of the control device 50 is positive, from the parent power meter 100. Then, in a case where the determination result in step S5 is positive and the authentication result of the control device 50 is positive (Yes in step S5), in step S40, the control device 50 acquires the session key, necessary for the mutual authentication between the parent power meter 100 and the control device 50, from the power-supply-availability determination information received in step S4, by the function of the power supply control unit 52, and performs the mutual authentication with the parent power meter 100 using the session key. In a case where the mutual authentication with the parent power meter 100 fails, that is, a case where it is determined that the parent power meter 100 is not right (No in step S41), the control device 50 ends the charge/discharge control process without supplying power to the power-supplied device 70.

In contrast, in a case where the control device 50 succeeds in the mutual authentication with the parent power meter 100, that is, a case where the control device 50 determines that the parent power meter 100 is right and the parent power meter 100 determines that the control device 50 is right (Yes in step S41), in step S6, the control device 50 supplies power to the power-supplied device 70 through the power supply line. In this case, with respect to the power supplied to the power-supplied device 70, the control device 50 measures the amount of power and the period of time when the power has been supplied, by the function of the power measuring unit 53. Next, in step S42, the control device 50 transmits the power measurement information, representing the power measured by the function of the power measuring unit 53, to the parent power meter 100. When the power is being supplied to the power-supplied device 70, with respect to the power, the parent power meter 100 also measures the amount of power and the period of time when the power has been supplied, and transmits the power measurement information, representing the power measured by the parent power meter 100, to the control device 50. If receiving the power measurement information from the parent power meter 100 by the function of the communication unit 51 in step S43, in step S44, the control device 50 performs verification to determine whether the power represented by the power measurement information transmitted in step S42 matches the power represented by the power measurement information received from the parent power meter 100 in step S43, by the function of the power supply control unit 52.

In a case where the verification result is that the former power matches the latter power (Yes in step S44), in step S7, the control device 50 transmits the power measurement information representing the power measured by the power measuring unit 53 and the consumer identification information received in step S2, to the second server 90 through the parent power meter 100. In contrast, in a case where the former power does not match the latter power (No in step S44), the control device 50 generates the verification failure information representing the difference between the former power and the latter power. For example, in a case where the amounts of power are represented by the former power measurement information and the latter power measurement information, the verification failure information represents the difference between both amounts of power. In a case where the periods of time when the power has been supplied are represented by the former power measurement information and the latter power measurement information, the verification failure information represents the difference between both periods of time. Then, in step S45, the control device 50 adds the generated verification failure information to the power measurement information representing the power measured by the power measuring unit 53. Next, in step S7, the control device 50 transmits the power measurement information having the verification failure information added thereto and the consumer identification information received in step S2, to the second server 90 through the parent power meter 100 by the function of the communication unit 51.

As described above, the control device 50 according to the third embodiment performs the mutual authentication with the parent power meter 100, which makes it possible to prevent the power measuring unit 53, which is the sub power meter, from being erroneously connected to the parent power meter without intending to be connected thereto. Also, even in the case where the authentication succeeds, the control device 50 performs verification on the power measurement information, and if the verification fails, the control device 50 transmits the verification failure information representing the difference in the power together with the power measurement information to the second server 90. Therefore, it becomes possible to reflect the difference in the power measurement between the parent power meter 100 and the sub power meter connected to the parent power meter 100 to the billing process in the second server 90.

Modifications

The present invention is not limited to the above-mentioned embodiments, but can be realized by modifying components in an implementation phase without departing from the scope of the present invention. Also, various inventions can be made by appropriately combining the plurality of components disclosed in the above-mentioned embodiments. For example, from all components shown in the embodiments, some components may be removed. Also, components in different embodiments may be appropriately combined. Moreover, various modifications as exemplified below are possible.

In each of the above-mentioned embodiments, various programs to be run on the control device 50 may be stored in a computer connected to the network such as the Internet and be downloaded through the network. Also, the various programs may be recorded as installable or executable files in a recording medium, such as a CD-ROM, a flexible disk (FD), a CD-R, and a digital versatile disk (DVD), readable in the computer, and be provided as a computer program product.

Further, in each of the above-mentioned embodiments, the first server 80 and the second server 90 may be separately configured, or may be configured as the same device. Further, the control device 50 and at least one of the first server 80 and the second server 90 may be configured as the same device.

In each of the above-mentioned embodiments, the power measuring unit 53 has been described as the power meter included in the control device 50. However, the present invention is not limited thereto. The power measuring unit 53 may be configured to be separately connected to the control device 50. In this case, the control device 50 may acquire the power measurement information, representing the power measured by the power measuring unit 53, from the power measuring unit 53, and transmit the power measurement information and the consumer identification information received from the consumer communication device 60, to the second server 90.

In each of the above-mentioned embodiments, the power-supplied-device detecting unit 54 included in the control device 50 may further detect that the power-supplied device 70 is separated from the power supply line.

In each of the above-mentioned embodiments, for example, as shown in FIG. 6, the power supply control unit 52 of the control device 50 may control supply of power (discharge) from a discharge device 71 connected to the power supply line. The discharge device 71 is, for example, an electric vehicle having a storage battery unit for storing power. Specifically, in a case where a discharge-device detecting unit 55 detects that the discharge device 71 is connected to the power supply line, the power supply control unit 52 transmits the consumer authentication information, received from the consumer communication device 60 through the communication unit 51, to the first server 80 through the communication unit 51. Further, in a case of receiving discharge availability determination information, representing that discharge is possible, from the first server 80 through the communication unit 51, the power supply control unit 52 receives supply of power (discharge) from the discharge device 71 through the power supply line, appropriately stores the power, and supplies the stored power to the electric power company through the power supply line. With respect to the power supplied from the discharge device 71, the power measuring unit 53 measures the amount of power (power amount) or the period of time when the power has been supplied from the discharge device 71. Then, the power supply control unit 52 transmits the power measurement information representing the power measured by the power measuring unit 53 and the consumer identification information to the second server 90 through the communication unit 51. If receiving the power measurement information and the consumer identification information from the control device 50, the second server 90 performs a purchase process using the power measurement information such that the consumer identified by the consumer identification information pays a utility rate (discharge rate) for the power supplied from the discharge device 71.

Furthermore, in a case where the power supply control unit 52 can control both of charging to the power-supplied device 70 and discharging from the power-supplied device 70, when transmitting the consumer authentication information to the first server 80, the power supply control unit 52 may transmit charge/discharge identification information representing any one of charge and discharge to the first server 80. Further, when transmitting the power measurement information to the second server 90, the power supply control unit 52 may transmit the charge/discharge identification information representing any one of charge and discharge to the second server 90.

In each of the above-mentioned embodiments, the consumer identification information may include home electric power company identification information for identifying the electric power company with which the consumers make contracts and a virtual electric power company. The virtual electric power company is a company that does not supply power and mediates between the electric power company supplying power at each place and consumers who have not made contracts the electric power company. That is, when the virtual electric power company is under the contract the electric power company of each place, and power has been supplied from the control device 50, connected to a power supply line relaying supply of power from the electric power company with which a consumer has not made a contract, to the power-supplied device 70, as described above, the second server 90 performs the billing process using the power measurement information and the consumer identification information, so as to request the consumer to pay the charging rate for the power supplied from the control device 50 through the virtual electric power company.

In a charge/discharge control system having this configuration, the first server 80 and the second server 90 may be provided for each electric power company. In this case, if the communication unit 51 of the control device 50 receives the consumer authentication information from the consumer communication device 60, the power supply control unit 52 may select the first server 80 corresponding to the electric power company identified by the home electric power company identification information included in the consumer identification information included in the consumer authentication information, transmit the consumer authentication information to the selected first server 80 through the communication unit 51, select the second server 90 corresponding to the electric power company, and transmit the power measurement information and the consumer identification information to the selected second server 90 though the communication unit 51.

In each of the above-mentioned embodiments, the communication unit 51 included in the control device 50 may use Protocol for Carrying Authentication for Network Access (RANA) defined in RFC 5191 as a protocol for performing communication with the consumer communication device 60.

In each of the above-mentioned embodiments, in a case where the communication unit 51 of the control device 50 receives the power-supply-availability determination information from the first server 80, the communication unit 51 may transmit the power-supply-availability determination information to the consumer communication device 60.

In each of the above-mentioned embodiments, with respect to the transmission of the power measurement information and the consumer identification information to the second server 90, the control device 50 may divide a period between the beginning of the power supply to the power-supplied device 70 and the end of the power supply into partial periods with respect to arbitrary time points, and transmit the power measurement information representing the power amount or the power supply time and the consumer identification information for each partial period.

The above-mentioned second embodiment has been described such that in the case of detecting that the power-supplied device 70 is connected to the power supply line, the control device 50 transmits the power supply line identification information to the consumer communication device 60, and the consumer communication device 60 transmits the consumer authentication information and the power supply line identification information, received from the control device 50, to the control device 50. However, the control device 50 may not transmit the power supply line identification information to the consumer communication device 60 and the consumer communication device 60 may transmit power supply line identification information, input, for example, through a manipulation input unit included in the consumer communication device 60 by a user, together with the consumer authentication information to the control device 50. In this case, for example, the power supply line identification information may be written on a signboard disposed at the electric charging station, and the user may look at the signboard and input the power supply line identification information through the manipulation input unit of the consumer communication device 60, whereby the consumer communication device 60 acquires the power supply line identification information, and transmits the power supply line identification information and the consumer authentication information to the control device 50.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device comprising:
   a processor configured to
      detect that a power-supplied device is connected to a power supply line relaying supply of power;
      when it is detected that the power-supplied device is connected to the power supply line, receive consumer authentication information including consumer identification information for identifying a consumer from a communication device, transmit the consumer authentication information to a first server, receive power-supply-availability determination information representing whether supply of power to the power-supplied device is possible or not, from the first server, and transmit power measurement information representing power supplied to the power-supplied device through the power supply line and the consumer identification information to a second server;
      supply power to the power-supplied device when the power-supply-availability determination information represents that supply of power is possible; and
   a power meter configured to measure the power, wherein
   the processor transmits the power measurement information representing the measured power and the consumer identification information to the second server,
   the processor transmits the consumer authentication information to the first server and receives the power-supply-availability determination information from the first server, through a power measuring device disposed at an upstream of the power meter, and
   the processor is further configured to perform authentication on the power measuring device when the power-supply-availability determination information represents that supply of power is possible and to supply power to the power-supplied device in response to a result of the authentication.

2. The control device according to claim 1, wherein
   when the processor is within an area in which communication with the communication device is possible, the processor receives the consumer authentication information from the communication device by exclusively performing communication with the communication device.

3. The control device according to claim 1, wherein
when the communication device and the power-supplied device correspond to each other on a one-to-one basis, the processor transmits the consumer authentication information to the first server.

4. The control device according to claim 3, wherein
the power supply line is given first power supply line identification information for identifying the power supply line, and
the processor receives second power supply line identification information from the communication device, and transmits the consumer authentication information to the first server when the first power supply line identification information matches the second power supply line identification information.

5. The control device according to claim 1, wherein
the consumer identification information includes home electric power company identification information for identifying an electric power company with which a consumer makes a contract,
when the consumer authentication information is received, the processor selects a first server corresponding to the electric power company identified by the home electric power company identification information included in the consumer authentication information, and a second server corresponding to the electric power company, and
the processor transmits the consumer authentication information to the selected first server, and transmits the power measurement information and the consumer identification information to the selected second server.

6. The control device according to claim 1, wherein
the consumer identification information includes home electric power company identification information for identifying a virtual electric power company,
when the consumer authentication information is received, the processor selects a first server corresponding to the virtual electric power company identified by the home electric power company identification information included in the consumer identification information included in the consumer authentication information, and a second server corresponding to the virtual electric power company, and
the processor transmits the consumer authentication information to the selected first server, and transmits the power measurement information and the consumer identification information to the selected second server.

7. The control device according to claim 1, wherein
the processor is further configured to
perform verification using power measured by the power meter and power measured by the power measuring device when the processor supplies power to the power-supplied device, and
the processor transmits the power measurement information and the consumer identification information to the second server through the power measuring device in response to a result of the verification.

8. The control device according to claim 7, wherein
when the verification fails, the processor transmits verification failure information representing a difference between the power measured by the power meter and the power measured by the power measuring device, the power measurement information, and the consumer identification information to the second server through the power measuring device.

9. The control device according to claim 1, wherein
the processor receives the consumer authentication information from the communication device using RFC 5191 which is an authentication protocol.

10. A control device comprising:
a processor configured to
detect that a discharge device is connected to a power supply line relaying supply of power;
when it is detected that the discharge device is connected to the power supply line, receive consumer authentication information including consumer identification information for identifying a consumer from a communication device, transmit the consumer authentication information to a first server, receive discharge availability determination information representing whether discharge from the discharge device is possible or not, from the first server, and transmit power measurement information representing power supplied from the discharge device through the power supply line and the consumer identification information to a second server;
receive power supplied from the discharge device when the discharge availability determination information represents that discharge is possible; and
a power meter configured to measure the power, wherein
the processor transmits the power measurement information representing the power measured by the power meter and the consumer identification information to the second server,
the processor transmits the consumer authentication information to the first server and receives the discharge availability determination information from the first server, through a power measuring device disposed at an upstream of the power meter, and
the processor is further configured to perform authentication on the power measuring device when the discharge availability determination information represents that supply of power is possible and to supply power to the power-supplied device in response to a result of the authentication.

11. A control method comprising:
detecting that a power-supplied device is connected to a power supply line relaying supply of power;
receiving consumer authentication information including consumer identification information for identifying a consumer from a communication device when it is detected that the power-supplied device is connected to the power supply line;
transmitting the consumer authentication information to a first server;
receiving power-supply-availability determination information, representing whether supply of power to the power-supplied device is possible or not, from the first server;
supplying power to the power-supplied device when the power-supply-availability determination information represents that supply of power is possible;
transmitting power measurement information representing the power supplied to the power-supplied device through the power supply line and the consumer identification information to a second server;
measuring the power by a power meter;
transmitting the power measurement information representing the power measured by the power meter and the consumer identification information to the second server;

transmitting the consumer authentication information to the first server and receiving the power-supply-availability determination information from the first server, through a power measuring device disposed at an upstream of the power meter;

performing authentication on the power measuring device when the power-supply-availability determination information represents that supply of power is possible; and supplying power to the power-supplied device in response to a result of the authentication.

12. A control method comprising:

detecting that a discharge device is connected to a power supply line relaying supply of power;

receiving consumer authentication information including consumer identification information for identifying a consumer from a communication device when it is detected the discharge device is connected to the power supply line;

transmitting the consumer authentication information to a first server;

receiving discharge availability determination information, representing whether discharge from the discharge device is possible or not, from the first server;

receiving power supplied from the discharge device when the discharge availability determination information represents that discharge is possible;

transmitting power measurement information representing the power supplied from the discharge device through the power supply line and the consumer identification information to a second server;

measuring the power by a power meter;

transmitting the power measurement information representing the power measured by the power meter and the consumer identification information to the second server;

transmitting the consumer authentication information to the first server and receiving the discharge availability determination information from the first server, through a power measuring device disposed at an upstream of the power meter;

performing authentication on the power measuring device when the discharge availability determination information represents that supply of power is possible; and discharging power from the discharge device in response to a result of the authentication.

13. A computer program product comprising a non-transitory computer readable medium including programmed instructions, wherein the instructions, when executed by a computer, cause the computer to perform:

detecting that a power-supplied device is connected to a power supply line relaying supply of power;

receiving consumer authentication information including consumer identification information for identifying a consumer from a communication device when it is detected that the power-supplied device is connected to the power supply line;

transmitting the consumer authentication information to a first server;

receiving power-supply-availability determination information, representing whether supply of power to the power-supplied device is possible or not, from the first server;

supplying power to the power-supplied device when the power-supply-availability determination information represents that supply of power is possible;

transmitting power measurement information representing the power supplied to the power-supplied device through the power supply line and the consumer identification information to a second server;

measuring the power by a power meter;

transmitting the power measurement information representing the power measured by the power meter and the consumer identification information to the second server;

transmitting the consumer authentication information to the first server and receiving the power-supply-availability determination information from the first server, through a power measuring device disposed at an upstream of the power meter;

performing authentication on the power measuring device when the power-supply-availability determination information represents that supply of power is possible; and supplying power to the power-supplied device in response to a result of the authentication.

14. A computer program product comprising a non-transitory computer readable medium including programmed instructions, wherein the instructions, when executed by a computer, cause the computer to perform:

detecting that a discharge device is connected to a power supply line relaying supply of power;

receiving consumer authentication information including consumer identification information for identifying a consumer from a communication device when it is detected the discharge device is connected to the power supply line;

transmitting the consumer authentication information to a first server;

receiving discharge availability determination information, representing whether discharge from the discharge device is possible or not, from the first server;

receiving power supplied from the discharge device when the discharge availability determination information represents that discharge is possible;

transmitting power measurement information representing the power supplied from the discharge device through the power supply line and the consumer identification information to a second server;

measuring the power by a power meter;

transmitting the power measurement information representing the power measured by the power meter and the consumer identification information to the second server;

transmitting the consumer authentication information to the first server and receiving the discharge availability determination information from the first server, through a power measuring device disposed at an upstream of the power meter;

performing authentication on the power measuring device when the discharge availability determination information represents that supply of power is possible; and discharging power from the discharge device in response to a result of the authentication.

* * * * *